(12) United States Patent
Hase et al.

(10) Patent No.: US 12,459,343 B2
(45) Date of Patent: Nov. 4, 2025

(54) POWER STORAGE DEVICE

(71) Applicant: TOYOTA JIDOSHA KABUSHIKI KAISHA, Toyota (JP)

(72) Inventors: Saori Hase, Seto (JP); Yutaroh Gotoh, Toyota (JP); Tasuku Zeniya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 329 days.

(21) Appl. No.: 18/135,874

(22) Filed: Apr. 18, 2023

(65) Prior Publication Data

US 2023/0339306 A1     Oct. 26, 2023

(30) Foreign Application Priority Data

Apr. 25, 2022 (JP) ................................. 2022-071662

(51) Int. Cl.
| | |
|---|---|
| *B60K 1/04* | (2019.01) |
| *H01M 50/204* | (2021.01) |
| *H01M 50/244* | (2021.01) |
| *H01M 50/249* | (2021.01) |

(52) U.S. Cl.
CPC ............ *B60K 1/04* (2013.01); *H01M 50/204* (2021.01); *H01M 50/244* (2021.01); *H01M 50/249* (2021.01); *B60K 2001/0438* (2013.01)

(58) Field of Classification Search
CPC ............ B60K 1/04; B60K 2001/0348; H01M 50/204; H01M 50/244; H01M 50/249; H01M 2220/20; H01M 50/224; H01M 50/242; H01M 10/613; H01M 10/625; B60R 16/04
See application file for complete search history.

(56) References Cited

U.S. PATENT DOCUMENTS

| | | | |
|---|---|---|---|
| 11,084,386 B2 * | 8/2021 | Howard | ................... B60K 1/04 |
| 2014/0023906 A1 | 1/2014 | Hashimoto et al. | |
| 2020/0227706 A1 | 7/2020 | Kuno | |

FOREIGN PATENT DOCUMENTS

| | | |
|---|---|---|
| JP | 2012-176751 A | 9/2012 |
| JP | 2019-003808 A | 1/2019 |
| JP | 2020-113528 A | 7/2020 |
| JP | 2021-068521 A | 4/2021 |
| JP | 2021-079850 A | 5/2021 |

* cited by examiner

*Primary Examiner* — Jason D Shanske
*Assistant Examiner* — James J Triggs
(74) *Attorney, Agent, or Firm* — Dinsmore & Shohl LLP (57) ABSTRACT

A power storage device includes: a plurality of power storage modules; a pair of frame members extending along a first direction, and disposed to be spaced in a second direction perpendicular to the first direction such that the plurality of power storage modules are located therebetween; a plurality of cross members each connecting the pair of frame members to define a region in which each of the plurality of power storage modules is disposed; and a panel member covering the plurality of power storage modules. The plurality of cross members extend along the second direction and are disposed side by side in the first direction. The panel member includes a plurality of panel constituting members extending along the first direction and disposed side by side in the second direction.

5 Claims, 9 Drawing Sheets

POWER STORAGE DEVICE

CROSS REFERENCE TO RELATED APPLICATIONS

This nonprovisional application claims priority to Japanese Patent Application No. 2022-071662 filed on Apr. 25, 2022 with the Japan Patent Office, the entire contents of which are hereby incorporated by reference.

BACKGROUND

Field

The present disclosure relates to a power storage device mounted on a vehicle.

Description of the Background Art

As a conventional power storage device, Japanese Patent Laying-Open No. 2012-176751 discloses a configuration of housing three batteries (power storage modules) inside an outer frame member whose inside is defined by a T-shaped member. The outer frame member is connected to a framework forming member that forms a framework of a vehicle.

Specifically, a front end member of the outer frame member is connected to an extension side member, and a pair of side end members of the outer frame member are connected to a pair of side members. A rear end member of the outer frame member is connected to a rear cross member that forms the framework of the vehicle. Further, a bottom portion of the outer frame member is provided with an opening for enhancing heat dissipation of the batteries, and the batteries are exposed from the opening toward below a vehicular body.

SUMMARY

However, in the configuration disclosed in Japanese Patent Laying-Open No. 2012-176751, since the bottom portion of the outer frame member is provided with the opening, there is a concern that the strength of the bottom portion may be reduced and impact resistance may also be reduced.

The present disclosure has been made in view of the aforementioned problem, and an object of the present disclosure is to provide a power storage device that can enhance durability against impact.

A power storage device based on the present disclosure includes: a plurality of power storage modules; a pair of frame members extending along a first direction, and disposed to be spaced in a second direction perpendicular to the first direction such that the plurality of power storage modules are located therebetween; a plurality of cross members each connecting the pair of frame members to define a region in which each of the plurality of power storage modules is disposed; and a panel member covering the plurality of power storage modules. The plurality of cross members extend along the second direction and are disposed side by side in the first direction. The panel member includes a plurality of panel constituting members extending along the first direction and disposed side by side in the second direction.

According to the configuration described above, since the plurality of cross members are provided to extend in the second direction and the plurality of panel constituting members that constitute the panel member are provided to extend in the first direction, durability against impact from any of the first direction and the second direction can be enhanced.

In the power storage device based on the present disclosure, the plurality of panel constituting members may include a first constituting member and a second constituting member adjacent in the second direction. Further, an end portion of the first constituting member located closer to the second constituting member and an end portion of the second constituting member located closer to the first constituting member may include abutting portions that abut on each other in a direction in which the plurality of power storage modules and the panel member are aligned. In some embodiments, a gap between the first constituting member and the second constituting member is sealed by the abutting portions.

According to the configuration described above, by sealing the gap between the first constituting member and the second constituting member by the abutting portions, ingress of water from outside the panel member toward the power storage modules can be suppressed without using other members.

In some embodiments, the end portion of the first constituting member located closer to the second constituting member and the end portion of the second constituting member located closer to the first constituting member form a labyrinth structure.

According to the configuration described above, since the labyrinth structure is formed by the end portion of the first constituting member and the end portion of the second constituting member, ingress of water from a road surface side toward the power storage modules can be further suppressed.

In the power storage device based on the present disclosure, the first constituting member and the second constituting member may be constituted by members of an identical type having an identical shape.

According to the configuration described above, the panel member can be formed with reduced types of components, and thus manufacturing cost can be reduced.

In the power storage device based on the present disclosure, the first constituting member and the second constituting member may be constituted by metal members having different thermal expansion coefficients.

Since thermal expansion on one of the first constituting member and the second constituting member can be suppressed, reaction forces that act when expanding portions of the constituting members abut against each other can be suppressed, and distortion of the constituting members can be suppressed.

In some embodiments, each of the plurality of panel constituting members has a closed cross section extending along the first direction.

According to the configuration described above, if the panel member receives an impact, the closed cross section deforms and can absorb the impact. Thereby, protection of the power storage modules can be further enhanced.

The foregoing and other objects, features, aspects and advantages of the present disclosure will become more apparent from the following detailed description of the present disclosure when taken in conjunction with the accompanying drawings.

DETAILED DESCRIPTION

Hereinafter, embodiments of the present disclosure will be described in detail with reference to the drawings. It should be noted that, in the embodiments described below, identical or common parts will be designated by the same reference numerals in the drawings, and the description thereof will not be repeated.

First Embodiment

Figure 1:
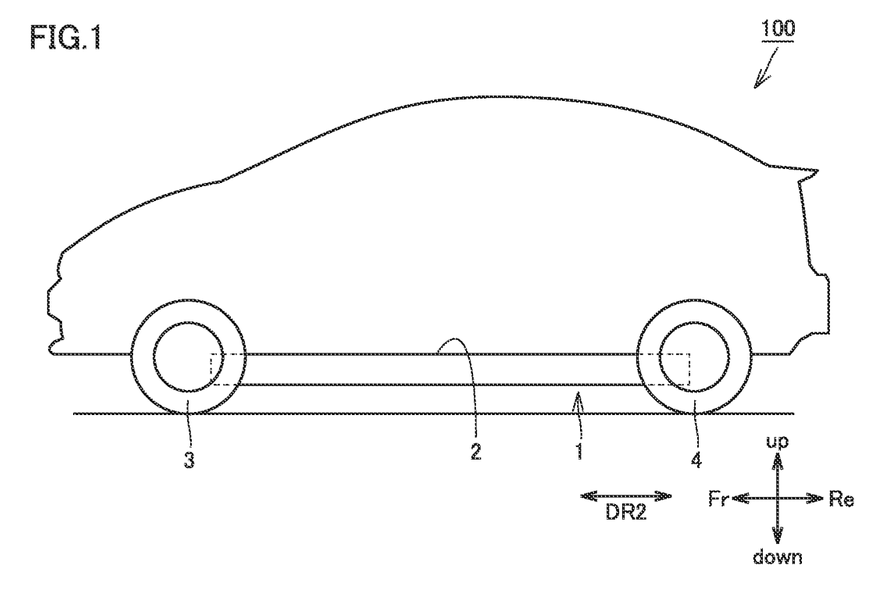
FIG. 1 is a schematic view showing a vehicle in accordance with a first embodiment.

FIG. 1 is a schematic view showing a vehicle in accordance with a first embodiment. Referring to FIG. 1, a vehicle 100 in accordance with the first embodiment will be described.

Vehicle 100 in accordance with the first embodiment is a hybrid vehicle that can run using motive power of at least one of a motor and an engine, or an electrically powered vehicle that runs using a driving force obtained by electrical energy.

Vehicle 100 includes a power storage device 1, a floor panel 2, front wheels 3, and rear wheels 4. Power storage device 1 is mounted under floor panel 2.

Figure 2:
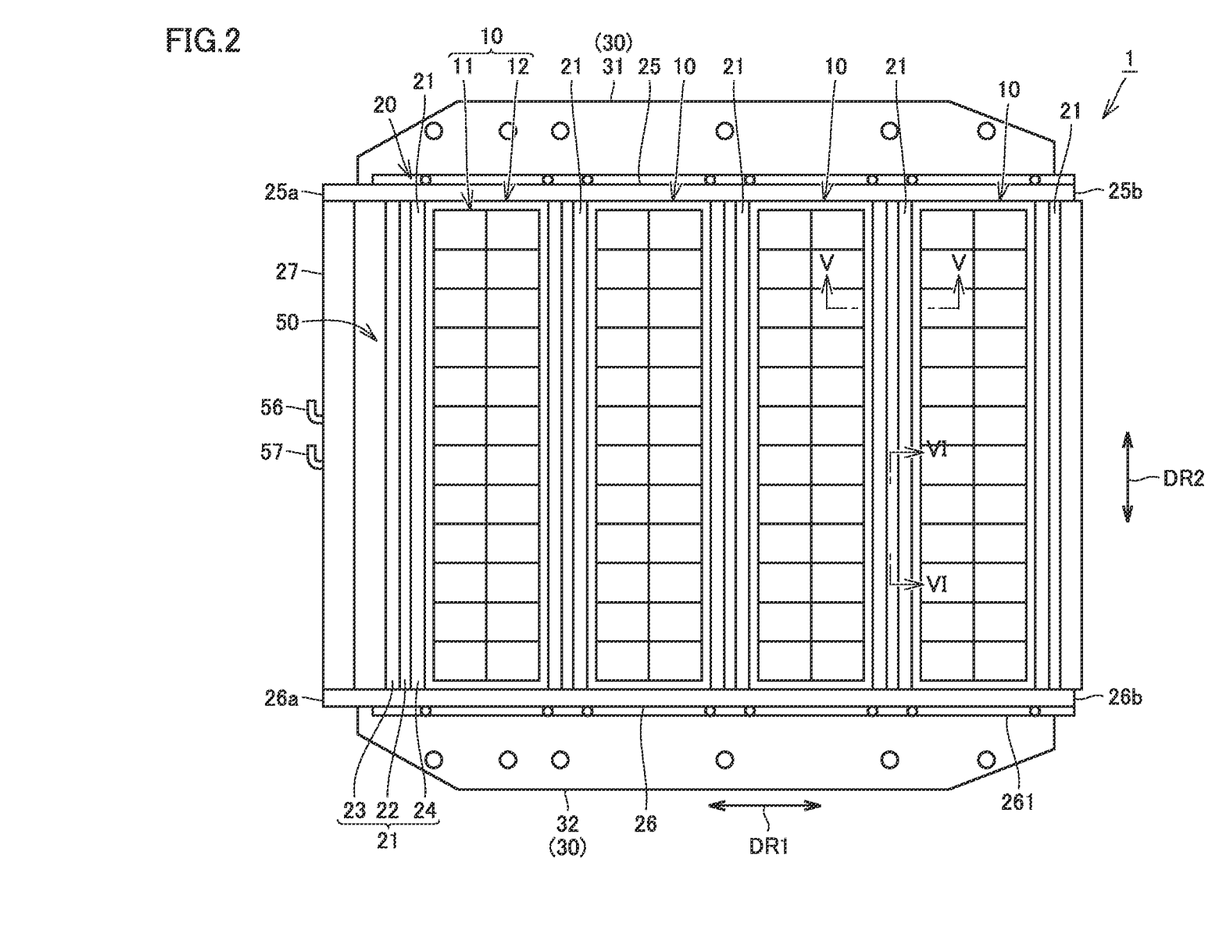
FIG. 2 is a top view of a power storage device in accordance with the first embodiment.
Figure 3:
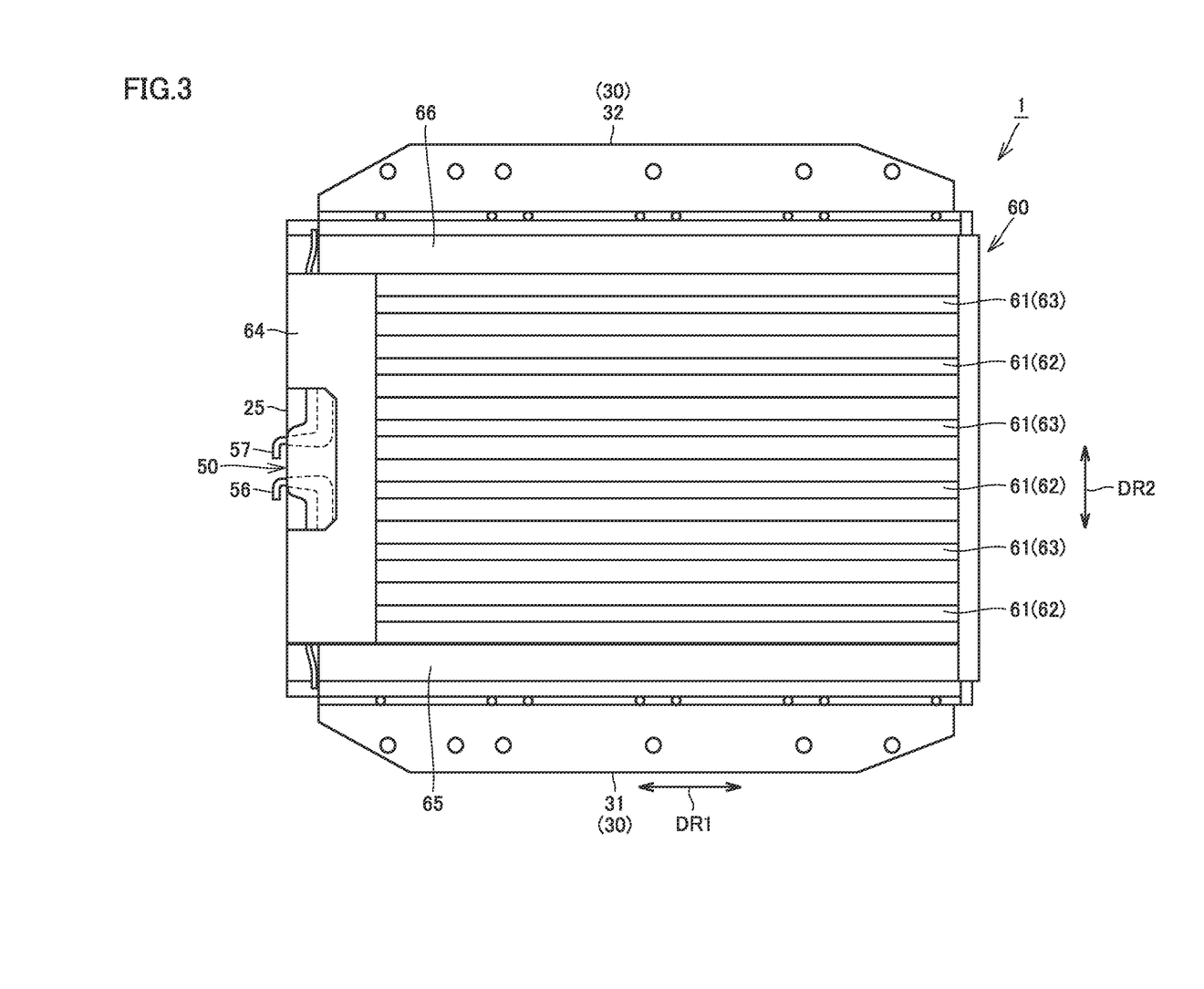
FIG. 3 is a bottom view of the power storage device in accordance with the first embodiment.
Figure 4:
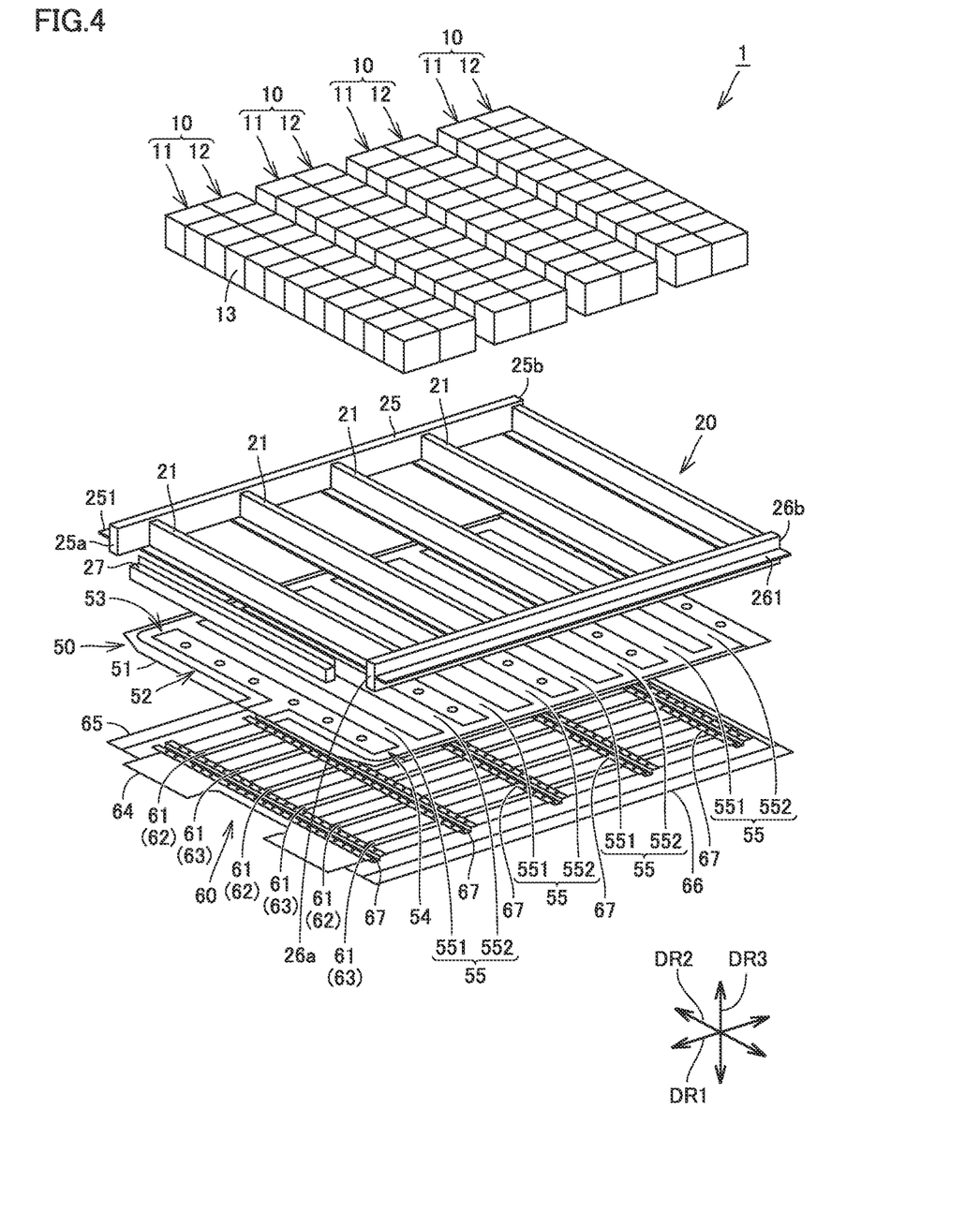
FIG. 4 is an exploded perspective view of the power storage device in accordance with the first embodiment.

FIG. 2 is a top view of the power storage device in accordance with the first embodiment. FIG. 3 is a bottom view of the power storage device in accordance with the first embodiment. FIG. 4 is an exploded perspective view of the power storage device in accordance with the first embodiment. It should be noted that, in FIGS. 2 to 4, a cover member covering a plurality of power storage modules 10 is omitted for convenience. Further, in FIG. 4, an attaching member 30 shown in FIGS. 2 and 3 is omitted for convenience. Referring to FIGS. 2 to 4, power storage device 1 in accordance with the first embodiment will be described.

As shown in FIGS. 2 to 4, power storage device 1 includes the plurality of power storage modules 10, a framework member 20 for the power storage modules, attaching member 30, a cooler 50, and a panel member 60.

The plurality of power storage modules 10 are disposed side by side to be spaced in a first direction (a DR1 direction). It should be noted that, in a mounted state where power storage device 1 is mounted on the vehicle, the first direction is parallel to a front-rear direction of vehicle 100, for example.

Each of the plurality of power storage modules 10 includes a first power storage stack 11 and a second power storage stack 12. First power storage stack 11 and second power storage stack 12 are disposed side by side in the first direction.

Each of first power storage stack 11 and second power storage stack 12 includes a plurality of power storage cells 13. The plurality of power storage cells 13 are disposed side by side in a second direction (a DR2 direction) perpendicular to the first direction. It should be noted that, in the mounted state, the second direction is parallel to a width direction of the vehicle, for example.

Each power storage cell 13 is, for example, a secondary battery such as a nickel-hydrogen battery or a lithium ion battery. Power storage cell 13 has a rectangular shape, for example. Power storage cell 13 may be a power storage cell using a liquid electrolyte, or a power storage cell using a solid electrolyte. Further, power storage cell 13 may be a unit capacitor configured to store power.

Framework member 20 for the power storage modules is a member that determines a region in which each of the plurality of power storage modules 10 is disposed. Framework member 20 for the power storage modules includes a pair of frame members 25 and 26, a plurality of cross members 21, and an end portion forming member 27.

The pair of frame members 25 and 26 extend along the first direction. The pair of frame members 25 and 26 are disposed to be spaced in the second direction such that the plurality of power storage modules 10 are located therebetween.

The pair of frame members 25 and 26 have flange portions 251 and 261 projecting outward in the second direction, at a central part in a height direction (a DR3 direction) perpendicular to the first direction and the second direction. It should be noted that, in the mounted state, the height direction is parallel to an up-down direction of vehicle 100.

Flange portion 251 is fixed to a first attaching member 31 described later, to sandwich first attaching member 31 between flange portion 251 and a side end portion forming member 65 described later. Flange portion 261 is fixed to a second attaching member 32 described later, to sandwich second attaching member 32 between flange portion 261 and a side end portion forming member 66 described later.

The pair of frame members 25 and 26 have end portions 25a and 26a located on one side in the first direction, and end portions 25b and 26b located on the other side in the first direction. It should be noted that the one side in the first direction refers to a front side in the front-rear direction of vehicle 100, and the other side in the first direction refers to a rear side in the front-rear direction of vehicle 100, in the mounted state.

The pair of frame members 25 and 26 are constituted by metal members, for example. The end portion forming member 27 connects end portions 25a and 26a of the pair of frame members 25 and 26, and constitutes one end of framework member 20 for the power storage modules on the one side in the first direction.

The plurality of cross members 21 each connect the pair of frame members 25 and 26 to define the region in which each of the plurality of power storage modules 10 is disposed. The plurality of cross members 21 extend along the second direction. One end of each cross member 21 located on one side in the second direction is connected to frame member 25, and the other end of each cross member 21 located on the other side in the second direction is connected to frame member 26. The plurality of cross members 21 are disposed side by side to be spaced in the first direction. The plurality of cross members 21 are constituted by metal members, for example.

Attaching member 30 is a member for attaching power storage device 1 to a vehicular body. Attaching member 30 includes first attaching member 31 and second attaching member 32.

First attaching member 31 is fixed to frame member 25 to project outward in the second direction from frame member 25. First attaching member 31 is attached to a right side frame member of the vehicle, for example.

Second attaching member 32 is fixed to frame member 26 to project outward in the second direction from frame member 26. Second attaching member 32 is attached to a left side frame member of the vehicle, for example.

Panel member 60 covers the plurality of power storage modules 10 and protects the plurality of power storage modules 10. Specifically, panel member 60 covers the plurality of power storage modules 10 from below. Panel member 60 includes a plurality of panel constituting members 61, an end portion forming member 64, a pair of side end portion forming members 65 and 66, and a plurality of fixing members 67.

The plurality of panel constituting members 61 extend along the first direction. The plurality of panel constituting members 61 are disposed side by side in the second direction to close gaps between adjacent panel constituting members 61. The plurality of panel constituting members 61 include a first constituting member 62 and a second constituting member 63 adjacent in the second direction. It should be noted that specific shapes of first constituting member 62 and second constituting member 63 will be described later with reference to FIG. 6.

End portion forming member 64 is connected to end portions of the plurality of panel constituting members 61 located on the one side in the first direction, and forms one end side of panel member 60 in the first direction. End portion forming member 64 is fixed to end portion forming member 27 described above. Specifically, for example, end portion forming member 64 is fastened to end portion forming member 27 by fastening members (not shown).

Side end portion forming member 65 is connected to panel constituting member 61 located closest to the one side in the second direction. Side end portion forming member 65 extends along the first direction. Side end portion forming member 65 forms an end portion of panel member 60 on the one side in the second direction.

Side end portion forming member 66 is connected to panel constituting member 61 located closest to the other side in the second direction. Side end portion forming member 66 extends along the first direction. Side end portion forming member 66 forms an end portion of panel member 60 on the other side in the second direction.

The plurality of fixing members 67 are members for fixing the plurality of panel constituting members 61 and the pair of side end portion forming members 65 and 66. The plurality of fixing members 67 extend along the second direction. The plurality of fixing members 67 extend along the second direction to straddle the pair of side end portion forming members 65 and 66 and the plurality of panel constituting members 61. The plurality of fixing members 67 are disposed side by side to be spaced in the first direction. The plurality of fixing members 67 are disposed at positions corresponding to the plurality of cross members 21.

The plurality of panel constituting members 61 and the pair of side end portion forming members 65 and 66 are fixed to the plurality of fixing members 67. Specifically, for example, the plurality of panel constituting members 61 and the pair of side end portion forming members 65 and 66 are fixed to the plurality of fixing members 67 by fastening members 70 (see FIG. 5).

Cooler 50 is a device for cooling the plurality of power storage modules 10. Cooler 50 is disposed between the plurality of power storage modules 10 and panel member 60. Cooler 50 has a plurality of cooling portions that come into thermal contact with the plurality of power storage modules 10. It should be noted that the plurality of cooling portions are constituted by a plurality of main flow path forming portions 55 described later.

Cooler 50 includes a body portion 51, a flow path forming portion 52 forming a refrigerant flow path through which a refrigerant flows, a refrigerant introducing portion 56, and a refrigerant discharging portion 57. Body portion 51 is provided in the shape of a plate. Flow path forming portion 52 is provided in body portion 51.

The refrigerant introduced from refrigerant introducing portion 56 into the refrigerant flow path cools the plurality of power storage modules 10, and is discharged from refrigerant discharging portion 57.

Flow path forming portion 52 has an introduction flow path forming portion 53, the plurality of main flow path forming portions 55, and a discharge flow path forming portion 54. Introduction flow path forming portion 53 connects refrigerant introducing portion 56 and an inlet side of each of the plurality of main flow path forming portions 55. Discharge flow path forming portion 54 connects refrigerant discharging portion 57 and an outlet side of each of the plurality of main flow path forming portions 55.

The plurality of main flow path forming portions 55 extend along the second direction. The plurality of main flow path forming portions 55 are disposed side by side to be spaced in the first direction. The plurality of main flow path forming portions 55 are provided at positions corresponding to the plurality of power storage modules 10. The plurality of main flow path forming portions 55 come into thermal contact with bottom portions of the plurality of power storage modules 10. Thereby, the plurality of power storage modules 10 can be cooled by the refrigerant flowing through main flow path forming portions 55.

Each cross member 21 is placed on an upper surface of body portion 51 located between main flow path forming portions 55 adjacent to each other.

Each of the plurality of main flow path forming portions 55 includes a first flow path forming portion 551 and a second flow path forming portion 552. First flow path forming portion 551 and second flow path forming portion 552 extend along the second direction, and are disposed side by side in the first direction. First flow path forming portion 551 is provided at a position corresponding to first power storage stack 11. Second flow path forming portion 552 is provided at a position corresponding to second power storage stack 12.

Figure 5:
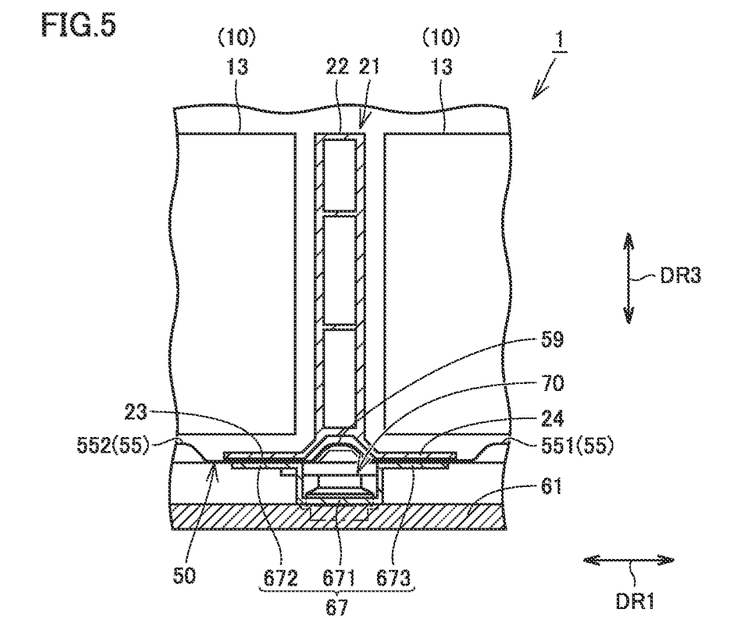
FIG. 5 is a schematic cross sectional view of the power storage device taken along a line V-V shown in FIG. 2.

FIG. 5 is a schematic cross sectional view of the power storage device taken along a line V-V shown in FIG. 2. Referring to FIG. 5, details of cross member 21 and fixing member 67 will be described.

Panel constituting member 61 is fixed to fixing member 67 by fastening member 70. Although not shown in FIG. 5, the pair of side end portion forming members 65 and 66 are also fixed to fixing member 67 by fastening members 70. Cooler 50 is provided with a recess portion 59 recessed upward to avoid interference with a leading end portion of fastening member 70.

Cross member 21 has a frame-shaped body portion 22, and a first flange portion 23 and a second flange portion 24.

First flange portion 23 is provided to project from a lower end of body portion 22 to the one side in the first direction. Second flange portion 24 is provided to project from the lower end of body portion 22 to the other side in the first direction.

Fixing member 67 has a substantially U-shaped body portion 671, and a third flange portion 672 and a fourth flange portion 673. Third flange portion 672 is provided to project from an upper end of body portion 671 located on the one side in first direction to the one side in the first direction. Fourth flange portion 673 is provided to project from an upper end of body portion 671 located on the other side in first direction to the other side in first direction.

First flange portion 23 and third flange portion 672 are fixed to cooler 50 to sandwich an upper surface of cooler 50 at a portion located between main flow path forming portions 55 adjacent to each other. Similarly, second flange portion 24 and fourth flange portion 673 are fixed to cooler 50 to sandwich the upper surface of cooler 50 at a portion located between main flow path forming portions 55 adjacent to each other. The flange portions may be fixed to cooler 50 by welding, or fastening with fastening members not shown.

By fixing cross member 21 and fixing member 67 in this manner, panel member 60 is fixed to cross members 21.

Figure 6:
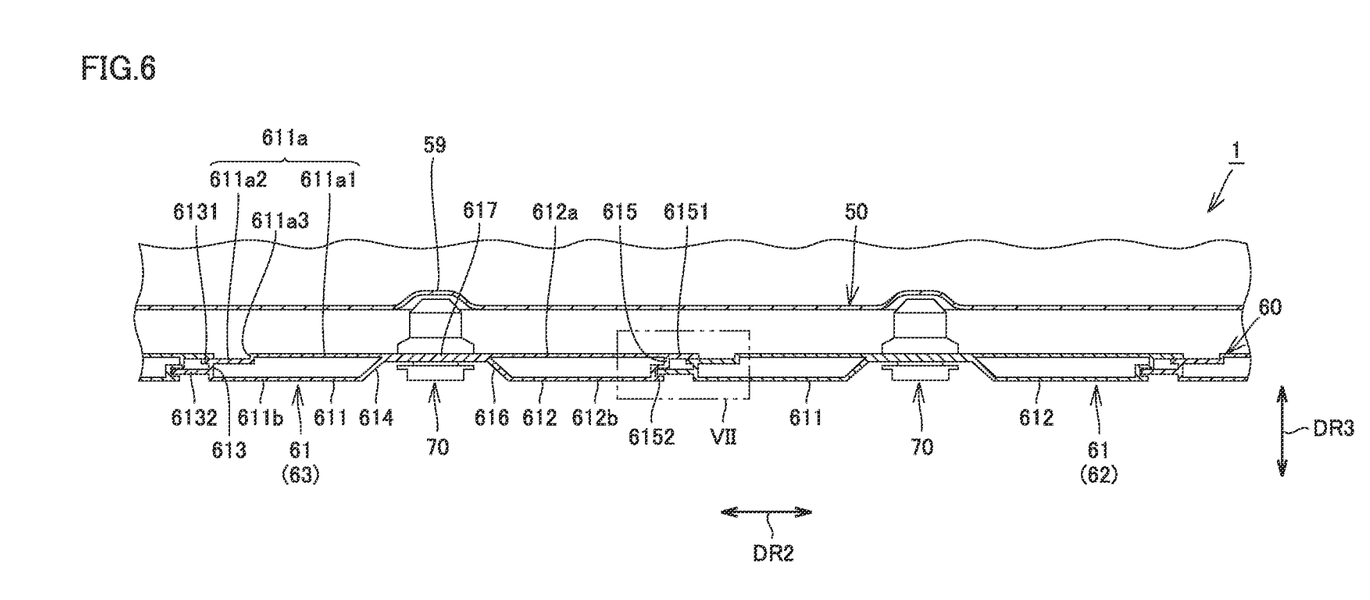
FIG. 6 is a schematic cross sectional view of the power storage device taken along a line VI-VI shown in FIG. 2.

FIG. 6 is a cross sectional view of the power storage device taken along a line VI-VI shown in FIG. 2. Referring to FIG. 6, details of panel constituting member 61 will be described.

Panel constituting member 61 has a first cylindrical portion 611, a second cylindrical portion 612, and a connecting portion 617. First cylindrical portion 611 is located on the one side in the second direction, and second cylindrical portion 612 is located on the other side in the second direction. First cylindrical portion 611 and second cylindrical portion 612 extend along the first direction, and each form a closed cross section. Connecting portion 617 has a flat plate shape, and connects first cylindrical portion 611 and second cylindrical portion 612.

First cylindrical portion 611 includes a top wall portion 611a, a bottom wall portion 611b, and a pair of side wall portions 613 and 614.

Top wall portion 611a has a first portion 611a1 and a second portion 611a2. First portion 611a1 and second portion 611a2 each have a flat plate shape. Second portion 611a2 is located closer to the one side in the second direction than first portion 611a1. Second portion 611a2 is located at a position lower than that of first portion 611a1, and a step portion 611a3 is formed between second portion 611a2 and first portion 611a1. Step portion 611a3 is a portion that connects an end portion of second portion 611a2 located on the other side in the second direction and an end portion of first portion 611a1 located on the one side in the second direction. Bottom wall portion 611b has a flat plate shape.

Side wall portion 613 connects end portions of top wall portion 611a and bottom wall portion 611b located on the one side in the second direction. Side wall portion 613 extends in a direction parallel to the height direction (up-down direction). Side wall portion 613 is provided with a first extending portion 6131 and a second extending portion 6132.

First extending portion 6131 extends from an upper end of side wall portion 613 toward the one side in the second direction. Second extending portion 6132 extends from between the upper end and a lower end of side wall portion 613 toward the one side in the second direction. Second extending portion 6132 is provided to project more toward the one side in the second direction than first extending portion 6131.

Side wall portion 613, first extending portion 6131, and second extending portion 6132 constitute an end portion of panel constituting member 61 located on the one side in the second direction.

Side wall portion 614 connects end portions of top wall portion 611a and bottom wall portion 611b located on the other side in the second direction. Side wall portion 614 is inclined upward as it extends toward the other side in the second direction.

Second cylindrical portion 612 includes a top wall portion 612a, a bottom wall portion 612b, and a pair of side wall portions 615 and 616.

Top wall portion 612a has a flat plate shape. Top wall portion 612a is constituted to be flush with first portion 611a1. Top wall portion 612a is provided at the same height position as that of first portion 611a1. Bottom wall portion 612b has a flat plate shape. Bottom wall portion 612b is provided at the same height position as that of bottom wall portion 611b. An end portion of bottom wall portion 612b located on the other side in the second direction is located closer to the one side in the second direction than an end portion of top wall portion 612a located on the other side in the second direction.

Side wall portion 615 connects the end portions of top wall portion 612a and bottom wall portion 612b located on the other side in the second direction. Side wall portion 615 has a crank shape, for example. Side wall portion 615 is provided with a receiving portion that receives second extending portion 6132. The receiving portion is constituted by a depressed portion depressed to the one side in the second direction provided in side wall portion 615. Side wall portion 615 is provided with a third extending portion 6151 and a fourth extending portion 6152.

Third extending portion 6151 extends from an upper end of side wall portion 615 toward the other side in the second direction. Fourth extending portion 6152 extends from a lower end of side wall portion 615 toward the other side in the second direction. Third extending portion 6151 is provided to project more toward the other side in the second direction than fourth extending portion 6152.

Side wall portion 615, third extending portion 6151, and fourth extending portion 6152 constitute an end portion of panel constituting member 61 located on the other side in the second direction.

Side wall portion 616 connects end portions of top wall portion 611a and bottom wall portion 611b located on the one side in the second direction. Side wall portion 616 is inclined upward as it extends toward the one side in the second direction.

Fastening member 70 penetrates through connecting portion 617, and panel constituting member 61 is fixed to fixing member 67 at connecting portion 617. Since side wall portion 614 and side wall portion 616 each have a taper as described above, a wide working space can be secured, and workability of a fastening work can be improved.

In the present embodiment, first constituting member 62 and second constituting member 63 have the same shape as that of panel constituting member 61 described above. Further, first constituting member 62 and second constituting member 63 are constituted by metal members of an identical type, such as aluminum, for example. In some embodiments, first constituting member 62 and second constituting member 63 are formed by extrusion molding.

By constituting first constituting member 62 and second constituting member 63 by members of an identical type having an identical shape as described above, the panel member can be formed with reduced types of components, and thus manufacturing cost can be reduced. Further, when first constituting member 62 and second constituting member 63 are made of aluminum, they can be easily extrusion-molded, and they can have lighter weights.

Figure 7:
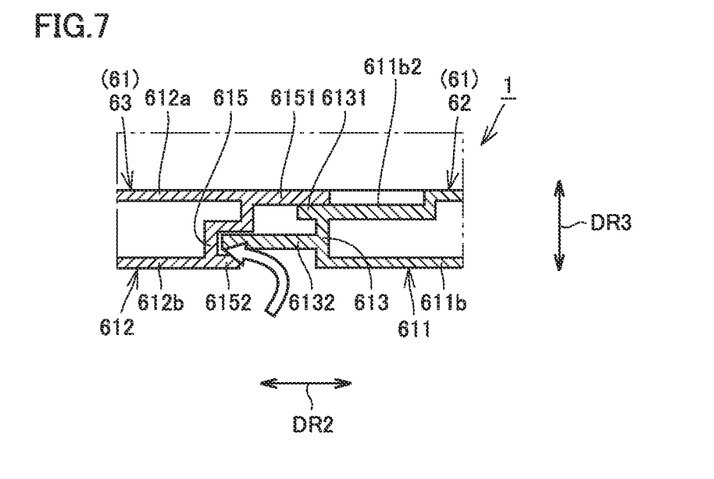
FIG. 7 is an enlarged view showing a region indicated by a line VII shown in FIG. 6 in an enlarged manner.

FIG. 7 is an enlarged view showing a region indicated by a line VII shown in FIG. 6 in an enlarged manner. Referring to FIG. 7, a manner of placing first constituting member 62 and second constituting member 63 adjacent to each other in the second direction will be described.

As shown in FIG. 7, an end portion of first constituting member 62 located closer to second constituting member 63 and an end portion of second constituting member 63 located closer to first constituting member 62 include abutting portions that abut on each other in the up-down direction, and a gap between first constituting member 62 and second constituting member 63 is sealed by the abutting portions.

Specifically, since first constituting member 62 and second constituting member 63 have side wall portion 613 and side wall portion 615 facing in the second direction, and first extending portion 6131 provided in side wall portion 613 and third extending portion 6151 provided in side wall portion 615 abut in the up-down direction, the gap between first constituting member 62 and second constituting member 63 is sealed. First extending portion 6131 and third extending portion 6151 correspond to the abutting portions. By sealing the gap between first constituting member 62 and second constituting member 63 in this manner, ingress of water from a road surface side toward power storage modules 10 can be suppressed.

Furthermore, the end portion of first constituting member 62 located closer to second constituting member 63 and the end portion of second constituting member 63 located closer to first constituting member 62 form a labyrinth structure.

Specifically, a leading end side of second extending portion 6132 provided in side wall portion 613 enters between the depressed portion and fourth extending portion 6152 formed in side wall portion 615, and thus the labyrinth structure is formed. Thereby, ingress of water from the road surface side toward the power storage modules can be further suppressed.

Since thermal expansion on one of the first constituting member and the second constituting member can be suppressed, reaction forces that act when expanding portions of the constituting members abut against each other can be suppressed, and distortion of the constituting members can be suppressed.

As described above, in power storage device 1 in accordance with the present embodiment, since the plurality of cross members are provided to extend in the second direction and the plurality of panel constituting members that constitute the panel member are provided to extend in the first direction, durability against impact from any of the first direction and the second direction can be enhanced.

Furthermore, the plurality of cross members 21 are disposed side by side in the first direction such that each of the plurality of cross members 21 connects the pair of frame members 25 and 26 extending along the first direction, and each power storage module 10 can be disposed between cross members 21 adjacent to each other. Thereby, the plurality of power storage modules 10 can be disposed in the same orientation, and efficiency of mounting power storage modules 10 can also be improved. As a result, energy density can also be improved.

Further, by disposing panel member 60 below the plurality of power storage modules 10 and covering the plurality of power storage modules 10 with panel member 60 from below as described above, the plurality of power storage modules 10 can be prevented from directly interfering with a road surface.

Further, in a case where each panel constituting member 61 has a closed cross section extending along the first direction, if panel member 60 receives an impact from the road surface or the like, for example, the closed cross section deforms and can absorb the impact. Thereby, protection of power storage modules 10 can also be further enhanced.

It should be noted that, although the embodiment described above has described a case where first constituting member 62 and second constituting member 63 are constituted by members of an identical type having an identical shape, first constituting member 62 and second constituting member 63 may be constituted by metal members having different thermal expansion coefficients. In this case, thermal expansion on one of first constituting member 62 and second constituting member 63 can be suppressed while maintaining strength by constituting them by metal members. Thus, reaction forces that act when expanding portions of the constituting members abut against each other can be suppressed, and distortion of the constituting members can be suppressed.

Second Embodiment

Figure 8:
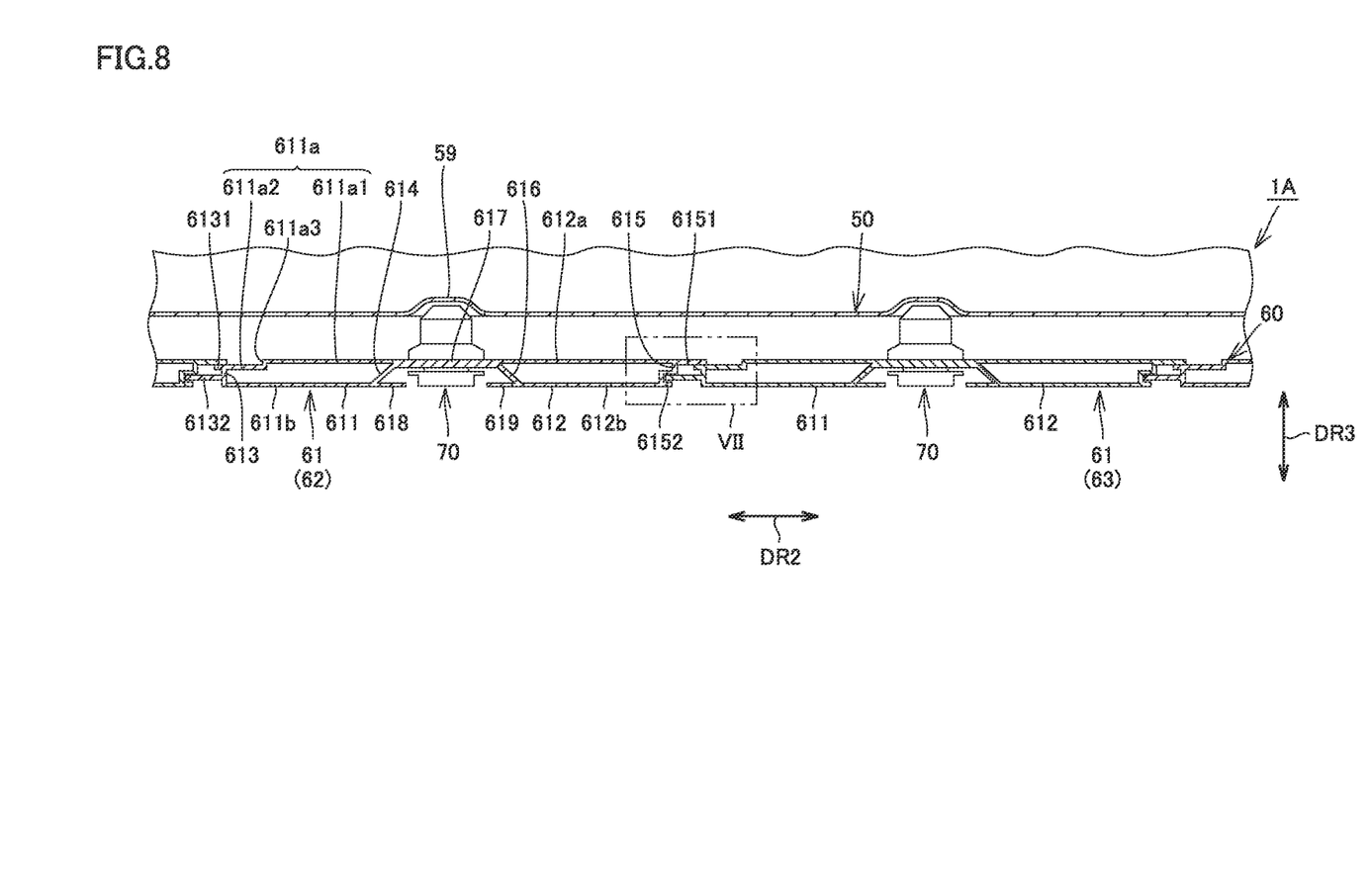
FIG. 8 is a partial cross sectional view of a power storage device in accordance with a second embodiment.

FIG. 8 is a partial cross sectional view of a power storage device in accordance with a second embodiment. It should be noted that FIG. 8 is a drawing corresponding to a portion taken along the line VI-VI shown in FIG. 2. Referring to FIG. 8, a power storage device 1A in accordance with the second embodiment will be described.

As shown in FIG. 8, when compared with power storage device 1 in accordance with the first embodiment, power storage device 1A in accordance with the second embodiment is different from power storage device 1 in that power storage device 1A includes projecting portions 618 and 619 projecting toward fastening member 70 in a region for fastening panel constituting member 61. Other than that, power storage device 1A has substantially the same configuration as that of power storage device 1.

Projecting portion 618 projects from the end portion of bottom wall portion 611*b* located on the other side in the second direction, toward the other side in the second direction. Projecting portion 619 projects from the end portion of bottom wall portion 612*b* located on the one side in the second direction, toward the one side in the second direction. A gap into which fastening member 70 can be inserted is formed between projecting portion 618 and projecting portion 619.

Also with such a configuration, power storage device 1A in accordance with the second embodiment has substantially the same effect as that in the first embodiment.

Further, since projecting portions 618 and 619 are provided, interference of a foreign matter from the road surface side with fastening member 70 and ingress of water into a fastening portion can be suppressed.

Third Embodiment

Figure 9:
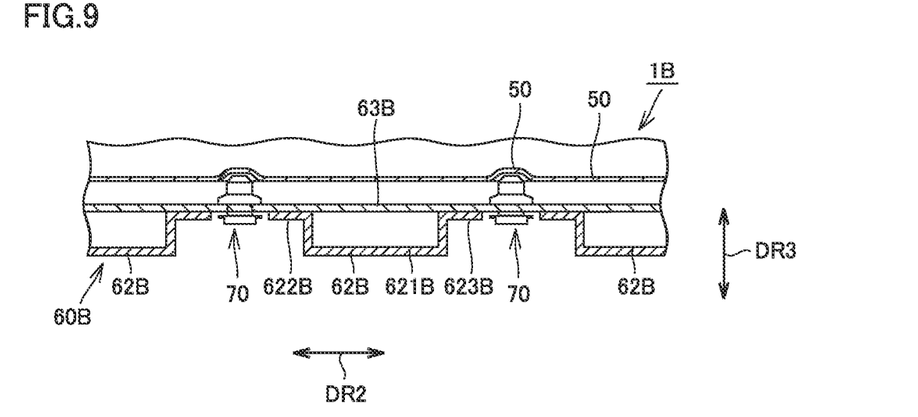
FIG. 9 is a partial cross sectional view of a power storage device in accordance with a third embodiment.

FIG. 9 is a partial cross sectional view of a power storage device in accordance with a third embodiment. Referring to FIG. 9, a power storage device 1B in accordance with the third embodiment will be described.

As shown in FIG. 9, when compared with power storage device 1 in accordance with the first embodiment, power storage device 1B in accordance with the third embodiment is different from power storage device 1 in the configuration of a panel member 60B. Other than that, power storage device 1B has substantially the same configuration as that of power storage device 1.

Panel member 60B includes a plurality of first panel constituting members 62B and a second panel constituting member 63B. Second panel constituting member 63B has a substantially flat plate shape, for example.

The plurality of first panel constituting members 62B are disposed side by side to be spaced in the second direction. The plurality of first panel constituting members 62B are provided to extend in the first direction. The plurality of first panel constituting members 62B are fixed to second panel constituting member 63B.

Each first panel constituting member 62B has a substantially U-shaped body portion 621B and flange portions 622B and 623B. Flange portion 622B extends from an upper end of body portion 621B located on the one side in the second direction, toward the one side in the second direction. Flange portion 623B extends from an upper end of body portion 621B located on the other side in the second direction, toward the other side in the second direction.

Flange portions 622B and 623B are fixed to second panel constituting member 63B by welding, with fastening members, or the like. Thereby, the plurality of first panel constituting members 62B are fixed to second panel constituting member 63B.

Also with such a configuration, power storage device 1B in accordance with the third embodiment has substantially the same effect as that in the first embodiment, as the plurality of first panel constituting members 62B extending in the first direction are disposed side by side in the second direction.

It should be noted that, although the first to third embodiments described above have described a case where the panel member covers the plurality of power storage modules from below, the position of the panel member is not limited to below the plurality of power storage modules. As long as the panel member can cover the plurality of power storage modules (the panel member is disposed to be aligned with the plurality of power storage modules), the panel member may be located above the plurality of power storage modules, or may be located beside the plurality of power storage modules.

Although the embodiments of the present disclosure have been described, it should be understood that the embodiments disclosed herein are illustrative and non-restrictive in every respect. The scope of the present disclosure is defined by the scope of the claims, and is intended to include any modifications within the scope and meaning equivalent to the scope of the claims.

What is claimed is:

1. A power storage device comprising:
   a plurality of power storage modules;
   a pair of frame members extending along a first direction, and disposed to be spaced in a second direction perpendicular to the first direction such that the plurality of power storage modules are located therebetween;
   a plurality of cross members each connecting the pair of frame members to define a region in which each of the plurality of power storage modules is disposed; and
   a panel member covering the plurality of power storage modules, wherein:
   the plurality of cross members extending along the second direction and being disposed side by side in the first direction,
   the panel member including a plurality of panel constituting members extending along the first direction and disposed side by side in the second direction,
   the plurality of panel constituting members include a first constituting member and a second constituting member adjacent in the second direction,
   an end portion of the first constituting member located closer to the second constituting member and an end portion of the second constituting member located closer to the first constituting member include abutting portions that abut on each other in a direction in which the plurality of power storage modules and the panel member are aligned, and
   a gap between the first constituting member and the second constituting member is sealed by the abutting portions.

2. The power storage device according to claim 1, wherein the end portion of the first constituting member located closer to the second constituting member and the end portion of the second constituting member located closer to the first constituting member form a labyrinth structure.

3. The power storage device according to claim 2, wherein the first constituting member and the second constituting member are constituted by members of an identical type having an identical shape.

4. The power storage device according to claim 1, wherein the first constituting member and the second constituting member are constituted by metal members having different thermal expansion coefficients.

5. The power storage device according to claim 1, wherein each of the plurality of panel constituting members has a closed cross section extending along the first direction.

* * * * *